United States Patent
Schmetz

[11] Patent Number: 5,855,933
[45] Date of Patent: Jan. 5, 1999

[54] TEMPERATURE-CONTROLLABLE TOOL OR MOLD FOR PRODUCING PLASTIC MOLDINGS AND PROCESS FOR MAKING SUCH TOOLS OR MOLDS

[75] Inventor: Klaus Schmetz, Menden, Germany

[73] Assignee: Innova Zug AG, Zug, Switzerland

[21] Appl. No.: 416,786

[22] PCT Filed: Oct. 16, 1993

[86] PCT No.: PCT/DE93/00987

§ 371 Date: Jun. 12, 1995

§ 102(e) Date: Jun. 12, 1995

[87] PCT Pub. No.: WO94/08770

PCT Pub. Date: Apr. 28, 1994

[30] Foreign Application Priority Data

Oct. 16, 1992 [DE] Germany ............... 42 34 961.3

[51] Int. Cl.[6] .................................................. B29C 33/04
[52] U.S. Cl. ...................... 425/552; 228/174; 249/79; 249/80
[58] Field of Search ........................ 228/174; 425/552; 249/79, 80

[56] References Cited

U.S. PATENT DOCUMENTS

| | | | |
|---|---|---|---|
| 1,574,175 | 2/1926 | Schranz | 100/93 R |
| 2,458,427 | 1/1949 | Russell et al. | 76/107.1 |
| 3,181,200 | 5/1965 | Joseph | 425/470 |
| 3,918,875 | 11/1975 | Phillipson et al. | 249/79 |
| 3,941,547 | 3/1976 | Hunyar et al. | 425/407 |
| 4,245,811 | 1/1981 | Brunner et al. | 249/79 |
| 4,648,546 | 3/1987 | Gellert | 228/161 |
| 4,801,068 | 1/1989 | Graczoll et al. | 228/174 |
| 4,832,254 | 5/1989 | Peuke et al. | 228/174 |
| 5,423,670 | 6/1995 | Hamel | 425/552 |

FOREIGN PATENT DOCUMENTS

| | | | |
|---|---|---|---|
| A-0 143 876 | 6/1985 | European Pat. Off. | B29C 33/02 |
| 1357 281 | 5/1963 | France . | |
| A-2 493 215 | 5/1982 | France | B29C 1/00 |
| 24 11 673 | 9/1975 | Germany | 249/79 |
| 2-75440 | 3/1990 | Japan | 228/174 |

*Primary Examiner*—Robert Davis
*Attorney, Agent, or Firm*—Standley & Gilcrest

[57] ABSTRACT

In a temperature-controllable tool (11) or mould for producing plastic mouldings with at least one cavity (12) to accept the mould of the plastic moulding to be produced, at least one inlet or outlet aperture (13, 14) which are interconnected via channels (15) and form a temperature-control agent channel system for cooling or heating the mould cavity (12), the shot time (cycle time) is shortened, maintenance is made easier and higher quality injection-moulded components are obtained in that the run of the channels (15) is matched to the outer shape of the mould cavity (12) and the geometry of the channels (15) is matched to the temperature profile in the plastic moulding. A process for making such a tool or mould comprises the following steps: separating the tool or the mould in the planes of the channels to be produced; producing the channels in accordance with the desired cycle in at least one separating surface of the opened tool or mould by milling or the like; and joining the separated parts of the tool or mould together.

5 Claims, 4 Drawing Sheets

TEMPERATURE-CONTROLLABLE TOOL OR MOLD FOR PRODUCING PLASTIC MOLDINGS AND PROCESS FOR MAKING SUCH TOOLS OR MOLDS

The invention relates to a process for the production of a tool and a corresponding mould which each have at least one inlet and outlet opening and internal channels.

In the injection moulding of plastics mould parts use is made of temperature-controlled tools or moulds consisting of one or more elements each having at least one inlet and outlet opening which are interconnected via at least one channel. Such tools or moulds serve as the "negative" of the plastics end products to be produced. A liquid plastics flow, supplied via a hot channel element (also known as a hot channel plate) from at least one injection moulding nozzle member of a plasticizing unit such as, for example, an extruder is forced via channels into the matching mould cavities. In dependence on the required shape of the end product, the mould cavities have a different geometry as a whole and also as regards the individual wall thicknesses of the plastics mould part.

The liquid plastics is either cured—i.e., chemically cross-linked—via the temperature control medium channel system situated in the moulds, or solidified by the removal of heat by the freezing of the plastics chains. After solidification, the plastics mould part is removed from the tool or mould.

The quality of such plastics mould parts as regards warping, internal stress component, surface quality and time after which the mould parts can be demoulded, depends decisively on the controllability of the heating or cooling process. A spatial course of the temperature control medium channel system and also the temperature of the temperature control medium in the particular zone of the tool or mould are of considerable significance; the channels and cavities should therefore be uniformly heated or cooled, to enable a dimensionally correct plastics mould part free from residual stress to be demoulded in the shortest possible time.

To this end the heat must be evenly introduced into the mould part and evenly removed therefrom over the whole tool or mould cavity surface. In the case of thermoplastic mould parts with single up to very different wall thicknesses this means that, for example, cooling must be performed more intensively in zones with accumulations of material than in zones where less material occurs.

As a rule, tools and moulds consist of single-part or multipart solid steel members purposefully formed from outside with a plurality of bores which approach the wall of the mould cavities except for a predetermined distance. However, such drilled channels, through which a medium can circulate, frequently lead to very inefficient cooling, since the channels can be produced only by straight drilling, so that only a limited influence can be exerted on the mould part to be produced as regards its actual contour and distance from the wall of the mould cavities. FIGS. 4 to 6 show a prior art tool for the production of a plastics mould part. The tool 1 is shown in vertical section in FIG. 4 and mainly consists of a bottom mould 1A, an annular mould 1B and an inner core mould 1C. The cavity enclosed by the three moulds 1A, 1B and 1C forms a mould cavity 2 whose shape corresponds to that of the plastics mould part to be produced.

FIG. 4 also shows an inlet opening 3 and an outlet opening 4 disposed concentrically thereof. They are connected to a channel 5 via which temperature control medium flows through the tool 1. FIG. 5 is a horizontal section through the bottom mould 1A, taken along the line V—V in FIG. 4. It can quickly be seen that the course followed by the channels 5 in the bottom mould 1A is not adapted to the round shape of the mould cavity 2. FIG. 6 is another horizontal section, taken along the line VI—VI in FIG. 4. In this case also an inlet opening 3 and an outlet opening 4 are provided which are interconnected via a channel 5. The channel 5 consists of a number of blind bores 6 which are closed by corresponding plugs 7.

Lastly, FIG. 4 also shows how the core mould 1C can also be constructed in several parts. The individual parts are interconnected via screwed connections (no reference). O-ring seals 8 are used for sealing the individual channels.

Although in the embodiment illustrated the plastics mould part has a constant wall thickness, it can quickly be seen that it is impossible to achieve a uniform supply and removal of heat by the prior art temperature control channels. Clearly, such an asymmetrical temperature profile involves considerable disadvantages as regards the quality of the mould part and its manufacturing time.

In dependence on the design of the mould part to be produced, at present it is impossible to position any bores at all, for example, in narrow zones of cores or in zones in which functionally-conditioned elements such as ejectors or the like must be disposed. This also leads to the already mentioned irregularities.

It is also known that in addition to the aforedescribed drilled channels with differing positions of the inlet and outlet openings, use is also made of blind bores with additional cooling tubes in an opening. However, in this case also the aforelisted problems arise; for example, with the use of cooling coils, the high injection pressures and speeds often cause unstable mould cores which have an effect on the dimensional stability of the workpieces. Mould parts screwed to one another are frequently protected against leakage by O-ring seals in the zone of the temperature control channels. The use of such O-ring seals has repeatedly proved to be problematical, more particularly due to the crevice corrosion which occurs.

A temperature control device for the making of gramophone records is also known from U.S. Pat. No. 3,181,200. That temperature control device also has a channel system for the rapid cooling of the inside of the tool after the injection of the plastics. This prior art temperature control device is described as having a temperature control channel in only one single plane. To achieve the necessary density, each of the mould halves having the channels is screwed to a cover plate. That construction may be adequate for the production of gramophone records, which as a rule call for the use of lower pressures than in the case of the injection moulds according to the invention, so that no sealing problems arise. Apart from this the known temperature control device is unsuitable for operating with extremely short cycle times. In the known temperature control device each mould part has only a single inlet and outlet opening, so that even with a very rapid flow of temperature control medium, it is quite impossible to obtain an absolutely even change in the temperature of the mould. In this case, therefore, the material of the mould tool is required to some extent as a "heat compensating layer", to enable plastics mould parts to be produced absolutely free from residual stress; as is indispensable in the production of gramophone records.

Lastly, U.S. Pat. No. 2,458,427 discloses a process for the production of gramophone records. A plate formed with spiral channels is brought between two steel plates and hard-soldered. On the one hand that process is very expensive and on the other it does not allow the channels to extend in any required way, since the plate containing the channels can have only channels of a geometry which still reliably ensures that the plate is held together, as is the case, for example, with the spiral shape shown in the embodiment illustrated.

It is therefore an object of the invention so to design and further develop the tool or mould specified and disclosed hereinbefore as to obviate the aforementioned disadvantages and more particularly to shorten the shot time (cycle time) and improve serviceability, so that the quality of the injection mouldings can be enhanced. Another object is to reliably obviate the previously unavoidable crevice corrosion and achieve a desirable improvement in the known temperature control system as a whole.

This problem is solved by the combination of the following process steps:

cutting up the tool or mould in the plane or planes of the channels to be produced, production of the channels to match the required course in at least one separating surface of the separated tool or mould by milling, erosion or the like, and connecting the separated parts of the tool or mould.

The tool and the mould produced by this process are characterized in that the channels extend in a number of planes, the course followed by the channels is adapted to the external shape of the mould cavity and the geometry of the channels is harmonized with the temperature profile in the plastics mould part.

According to the invention the cut-up mould parts are connected by brazing or high temperature soldering, more particularly in a vacuum furnace. There are no limitations on the tools or moulds produced by the process according to the invention as regards course followed by the temperature control channels or the geometrical design of the individual channels in each separated plane.

More particularly, it is also possible to make use of a choice of different temperature control media (water, oil, liquid gases, etc.). The corresponding volumetric flows of media can be controlled and adjusted manually, semi-automatically or automatically. Conveniently the corresponding devices are disposed outside the tool or mould. Also due to the short channel lengths made possible by the invention, a controlled changeover can be carried out of the medium supplied at the inlet and outlet openings.

The tools or mould elements produced according to the invention have a number of superimposed channel planes. The channels can be interconnected in the different planes inside the tool or the mould.

Since any required shape of channel can be produced, geometries can be obtained which confer, for example, a whirl on the medium as it flows through the channel. This leads to turbulences in the temperature control medium and therefore to an accelerated optimum heat exchange. The turbulences can be further intensified by introducing turbulence elements such as, for example, spirals, deflecting plates or the like into the channel. It is true that the use of such turbulence elements is known from the prior art in the field of heat exchanger construction, but hitherto such turbulence elements could be used solely due to the divisibility of the tools or moulds (cf. U.S. Pat. No. 31,81,200).

Since the construction and shape of the channels can be controlled, it is possible to design for each individual component of the tool or mould a number of cooling and heating circuits which can receive the required volumetric flows via at least one commercially available temperature control divider individually with a view to the end product. This leads to "trimmed" heat flows which can be controlled manually, semi-automatically or automatically; this can be done, for example, by visual examination of the final product during starting-up, before production begins.

The vacuum high temperature soldering technique preferably used reliably ensures that the moulds or tools are absolutely free from leakage. In this way internal cracks in the individual parts are automatically closed during the soldering process, so that crevice corrosion is reliably rendered impossible.

The invention makes possible improved constructions of tools and moulds. For example, instabilities in mould cores can be obviated by the feature that the soldered-in cooling insert absorbs the injection pressures, thus ensuring that the mould parts are dimensionally stable.

Other features of the invention can be gathered from the subclaims.

DESCRIPTION OF THE PREFERRED IMBODIMENTS

One embodiment of the invention will now be explained in greater detail with reference to the drawings.

Figure 1:
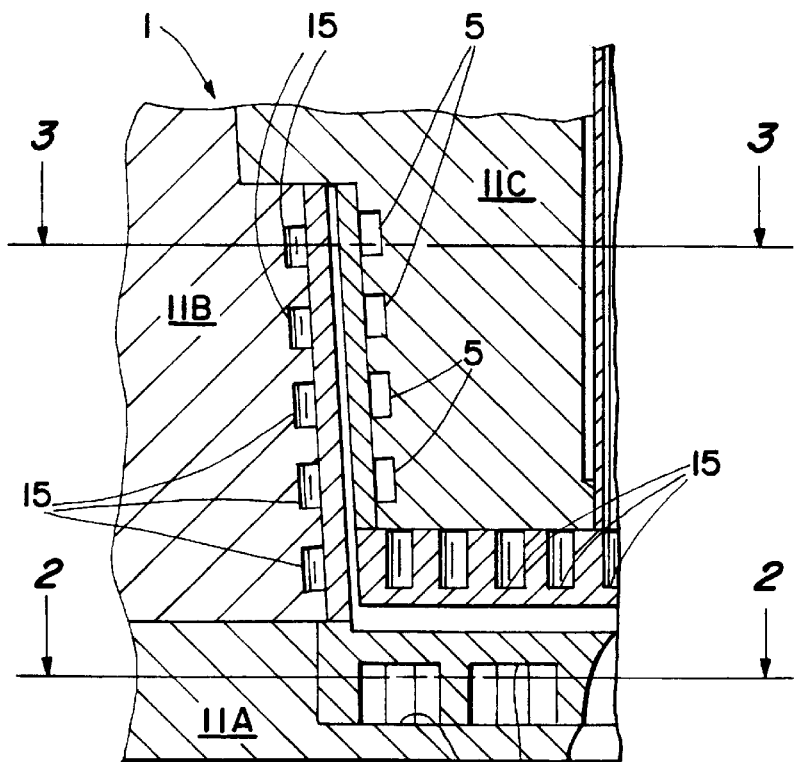
FIG. 1 a vertical section through a tool according to the invention.

FIG. 1 is a vertical section through a tool 11 according to the invention, which is of basically the same construction as the already mentioned prior art tool 1 and has a bottom mould 11A, an annular mould 11B and a mould core 11C. The tool according to the invention also has in each individual mould part an inlet opening 13 and an outlet opening 14. However, according to the invention the inlet and outlet openings 13, 14 are now produced by channels 15 whose course is adapted to the external shape of a mould cavity 12.

Figure 2:
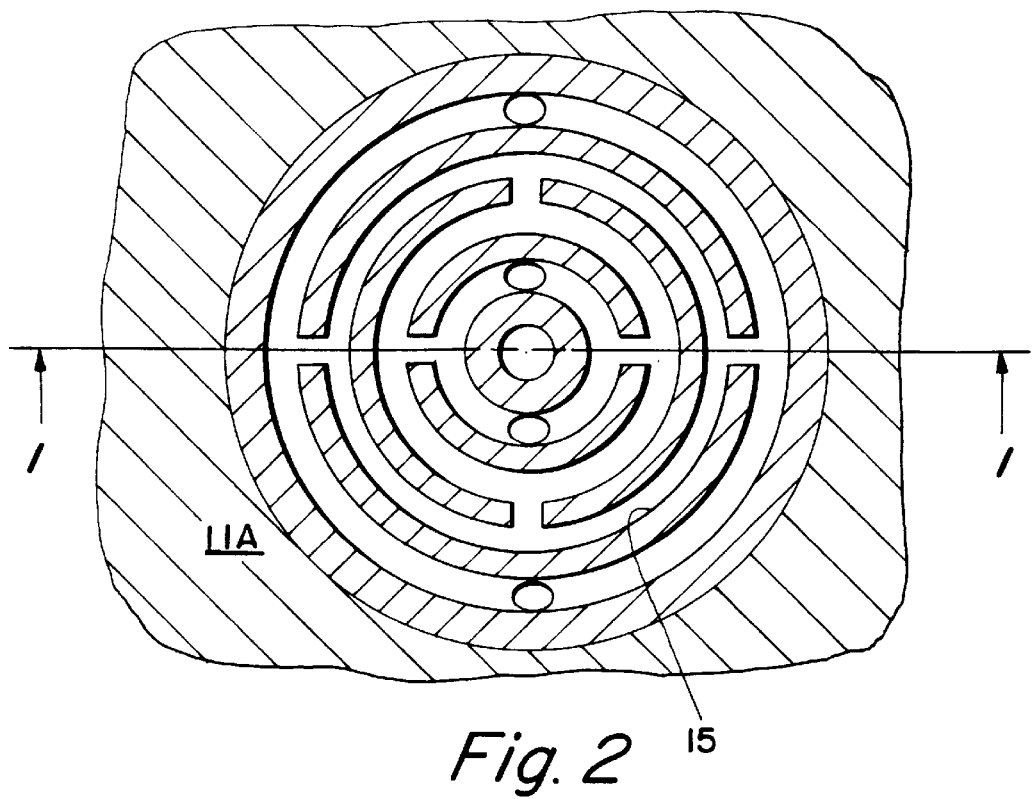
FIG. 2 the tool according to the invention, in horizontal section along the line II—II in FIG. 1, FIG. 3 the tool according to the invention, in horizontal section along the line III—III in FIG. 1, FIG. 4 a vertical section through a prior art tool, FIG. 5 the prior art tool, in horizontal section along the line V—V in FIG. 4, and FIG. 6 the prior art tool, in horizontal section along the line VI—VI in FIG. 4.
Figure 3:
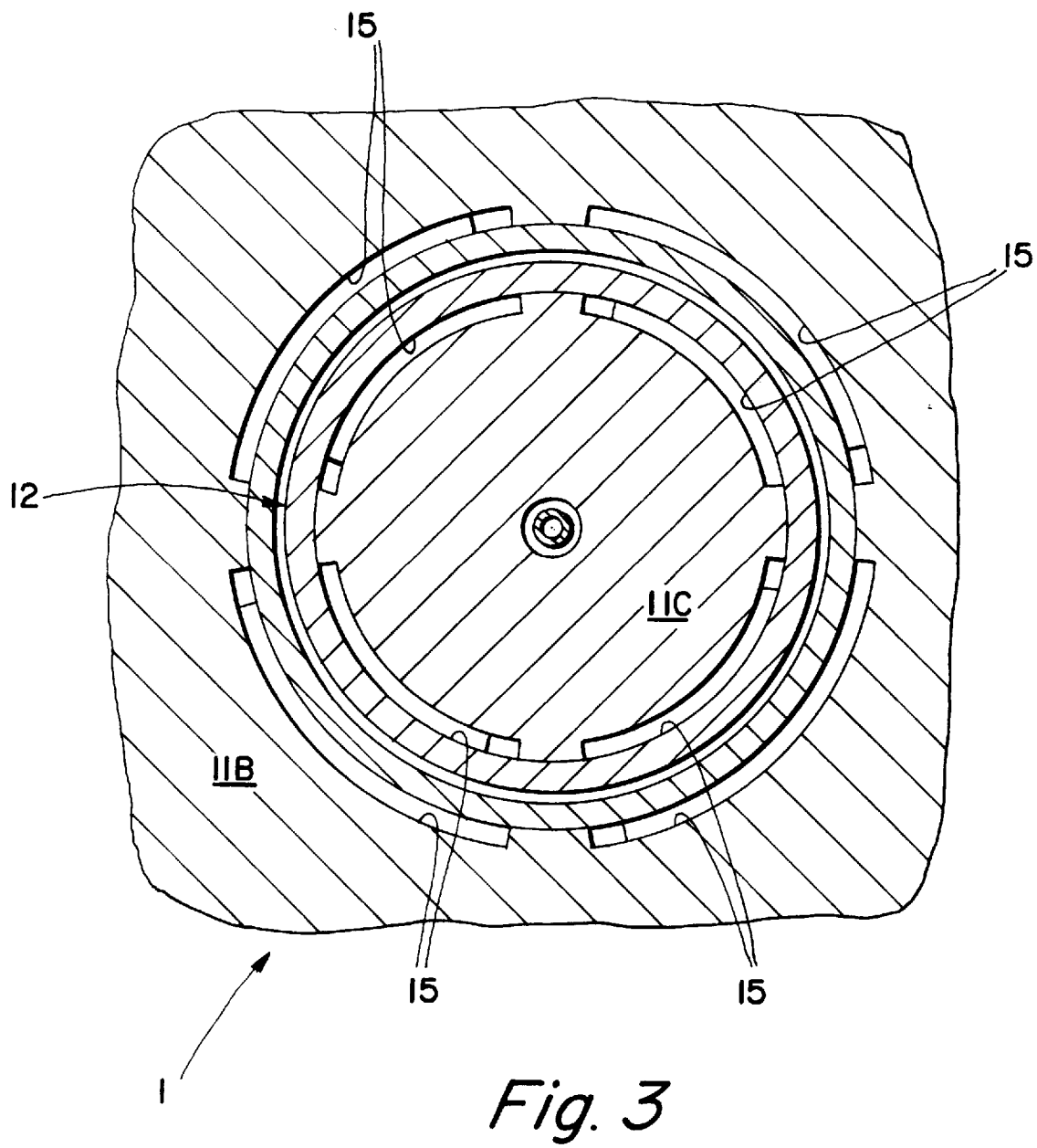
Figure 4:
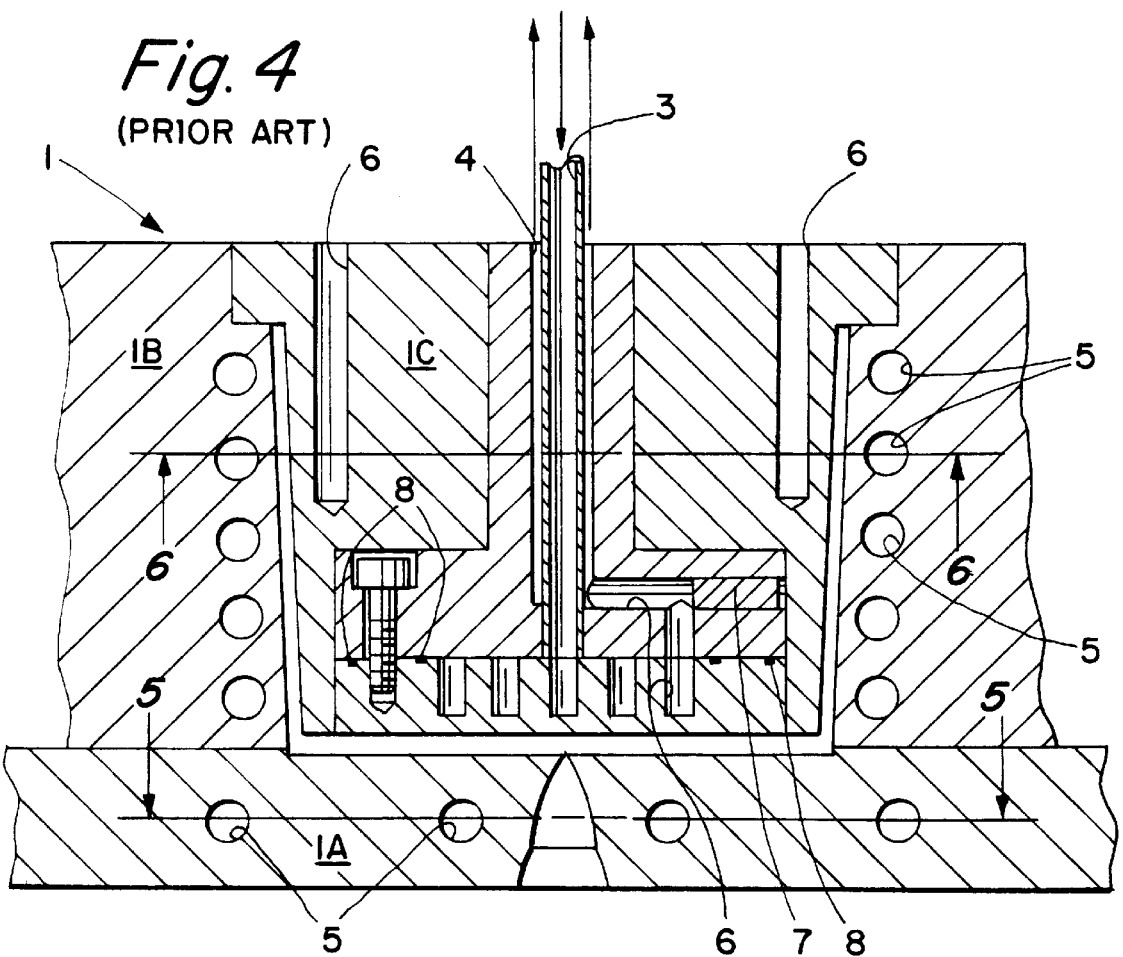
Figure 5:
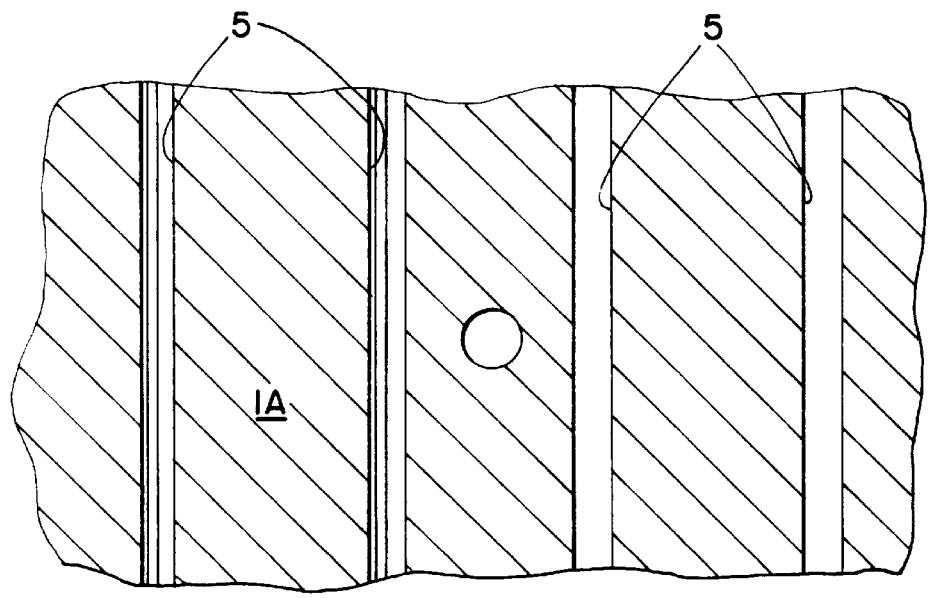
Figure 6:
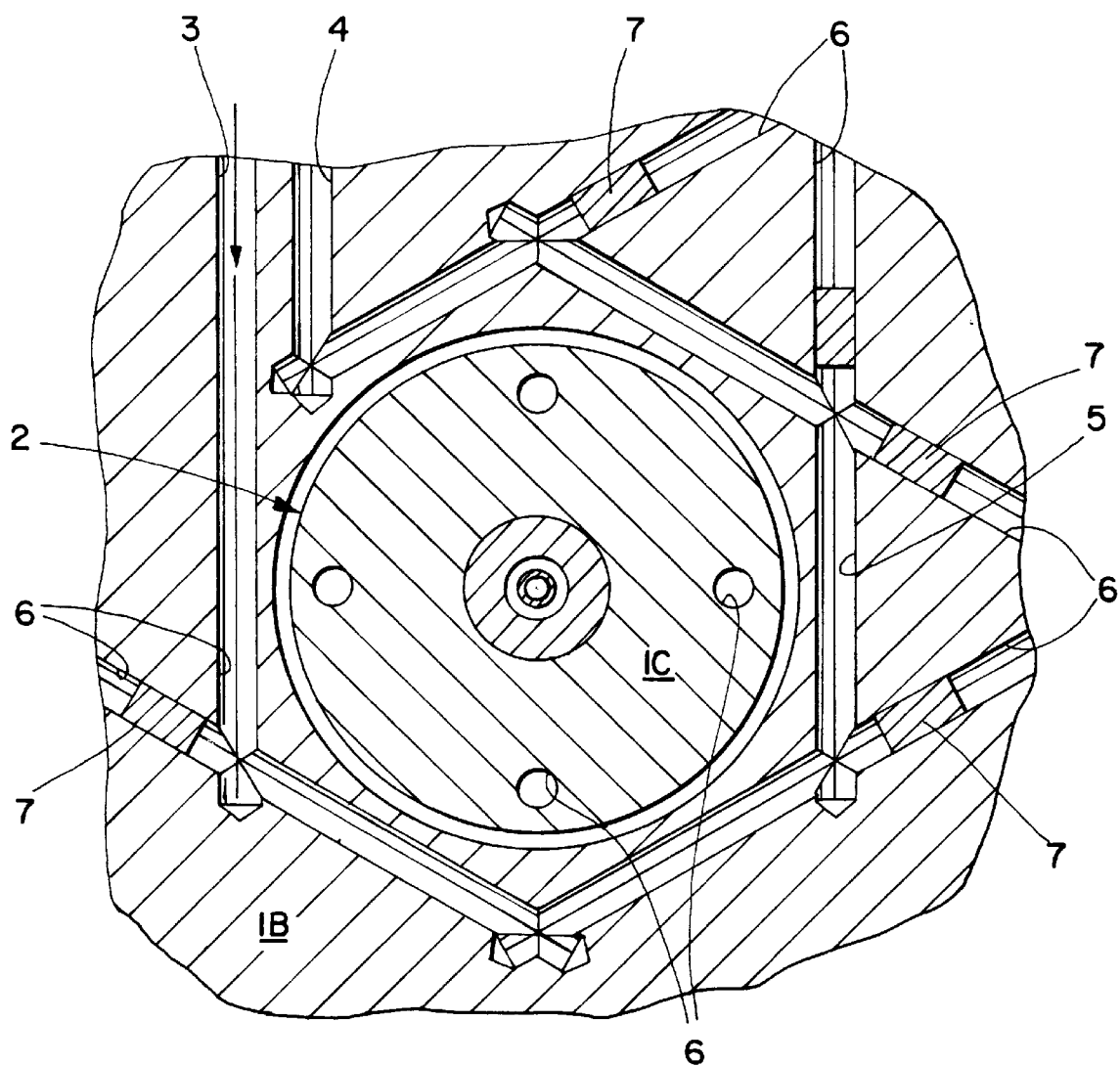

FIGS. 2 and 3 are horizontal sections taken along the lines II—II and III—III. It can quickly be seen that in the tool according to the invention the course followed by the channels 15 can be adapted in optimum manner to the geometry of the mould cavity 12. Furthermore, FIGS. 2 and 3 show how those surfaces of the tool moulds 11A, 11B and 11C which are immediately adjacent the mould cavity 12 have adequate stability.

It must again be pointed out that the drawing represents only a preferred embodiment. To make things clearer, the tools illustrated have mould cavities of plastics mould parts with a simple geometrical structure. Clearly, another possibility according to the invention is processing the channels in accordance with the planned volumetric flow of the temperature control medium by producing the required channel cross-section and/or the required channel geometry to match the temperature profile in the plastics mould part, if the plastics mould part has a more complicated geometrical shape and distribution of material. According to the invention, therefore, any existing temperature profile can be offset by an optimum cooling profile, thus achieving a laterally inverted supply and removal of heat for a required homogeneous temperature profile in a tool or mould.

According to the invention, therefore, the shot times (cycle times) are considerably shortened, accompanied by an enhancement of the quality of the injection mould parts, while at the same time the serviceability of such tools and forms is clearly improved.

I claim:

1. A temperature-controlled tool or a temperature-controlled mould for the production of plastics mouldings, produced by cutting up the tool or mould in a plane or planes of the channels to be produced to form two or more separated parts of the tool or mould, producing channels in at least one separating surface of the separated parts of the tool or mould, and connecting the separated parts of the tool or mould by brazing, the tool or mould comprising at least one mould cavity for receiving a shape of a plastics mould part to be produced and each mould cavity having at least one inlet and outlet opening, said inlet and outlet opening being interconnected via the channels to form a temperature control medium channel system for the cooling or heating of the mould cavity, characterized in that the channels extend in a number of planes, the course followed by the channels is adapted to an external shape of the mould cavity, and a geometry of the channels is harmonized with a temperature profile in the plastics mould part characterized in that a turbulence element is formed by suitable contours of a surface of the channel.

2. A tool or mould according to claim 1 further comprising a mechanical eddying element in the channel.

3. A process for the production of a tool and a corresponding mould which each have at least one inlet and outlet opening and internal channels, comprising:

cutting up the tool or mould in a plane or planes of the channels to be produced to form two or more separated parts of the tool or mould, producing channels to match a required course in at least one separating surface of the separated parts of the tool or mould, forming a contour in a surface of the channels to induce turbulence, and connecting the separated parts of the tool or mould.

4. The process of claim 3 wherein the separated parts are connected by brazing.

5. The process of claim 4 wherein the brazing is performed in a vacuum furnace.

* * * * *